United States Patent
Fruhauf (10) Patent No.: US 6,991,173 B2
(45) Date of Patent: Jan. 31, 2006

(54) METHOD AND APPARATUS FOR AUTORESET OF A USB SMART CARD DEVICE IN A MUTE MODE

(75) Inventor: Serge F. Fruhauf, Saratoga, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 183 days.

(21) Appl. No.: 10/614,279

(22) Filed: Jul. 7, 2003

(65) Prior Publication Data

US 2005/0006483 A1   Jan. 13, 2005

(51) Int. Cl.
*G06K 19/06* (2006.01)

(52) U.S. Cl. .................. 235/492; 710/19; 710/313
(58) Field of Classification Search ............... 235/492, 235/441, 435–438; 710/2, 19, 63, 100, 313; 713/1; 714/23–24, 30, 100

See application file for complete search history.

(56) References Cited

U.S. PATENT DOCUMENTS

| 6,269,443 B1 * | 7/2001 | Poisner et al. ................. 713/1 |
| 6,439,464 B1 | 8/2002 | Fruhauf et al. ............. 235/492 |
| 6,801,956 B2 * | 10/2004 | Feuser et al. ................. 710/14 |
| 6,840,454 B1 * | 1/2005 | Rhelimi ...................... 235/492 |
| 2002/0011516 A1 * | 1/2002 | Lee ............................. 235/380 |
| 2003/0093609 A1 * | 5/2003 | Drabczuk et al. ........... 710/315 |

FOREIGN PATENT DOCUMENTS

WO    WO 200231761 A1 *   4/2002

\* cited by examiner

*Primary Examiner*—Diane I. Lee
(74) *Attorney, Agent, or Firm*—David V. Carlson; Lisa K. Jorgenson (57) ABSTRACT

A universal serial bus (USB) smart card can be automatically reset from a mute mode. A processor on the smart card writes its status to a status register. A USB device controller polls the status register to determine the status of the processor. If the status from the status register indicates that the processor has entered the mute mode, the USB device controller initiates generation of a reset signal to reset the processor out of the mute mode.

43 Claims, 4 Drawing Sheets

METHOD AND APPARATUS FOR AUTORESET OF A USB SMART CARD DEVICE IN A MUTE MODE

BACKGROUND OF THE INVENTION

1. Field of the Invention

The present disclosure relates generally to smart card systems, and in particular but not exclusively, relates to automatically resetting a smart card (SC) device that has entered a mute mode.

2. Description of the Related Art

Smart cards are plastic cards having an embedded integrated circuit (IC). That IC may be a logic circuit with its associated memories, a microcontroller or microprocessor with its associated memories and software, or other type of intelligence.

The IC of an SC is typically coupled to contact pads, which allow the SC to communicate or perform transactions with external devices using some type of protocol. These external devices can include an SC reader, a host personal computer (PC), SC adapters and connectors, and the like. There are also "contactless" SCs that are available.

The mechanical and electrical specifications of SCs are published by the International Standard Organization (ISO). For instance, the ISO 7816 protocol supports contact modes for SCs, while the ISO 14443 protocol supports contactless modes for SCs.

The Universal Serial Bus (USB) standard has become firmly established and has gained wide acceptance in the PC marketplace. The USB standard was developed in response to a need for a standard interface that extends the concept of "plug and play" to devices external to a PC. It has enabled users to install and remove peripheral devices external to the PC without having to open the PC case or to remove power from the PC (e.g., without having to "reboot"). The USB standard provides a low-cost, high-performance serial interface that is easy to use and readily expandable, and is supported by an increasing number of SCs that are available in the marketplace.

A USB smart card sometimes goes into a "mute" state or "mute" mode. This is a state that the SC enters when it has detected a malfunction or other abnormal condition in its operation. The abnormal condition can include, but not be limited to, a change in the SC's embedded code, a hacker attack, receipt of an unauthorized command, and the like. In the mute mode, the SC no longer responds to further commands, and more particularly, the central processing unit (CPU) or other processor of the SC does not respond to any commands or requests presented on the USB port to which it is coupled.

One technique to remove the SC from the mute mode is to perform a "hard reset" on the SC (i.e., turn the power supplied to the SC's bus off and then turn the power back on) and start over. However, with USB implementations, if such a bus reset is used to reset the SC's CPU, the enumeration, configuration, etc. of the SC on the bus is lost. Some SC applications cannot accept the lost of such data.

BRIEF SUMMARY OF THE INVENTION

An aspect of the invention provides a smart card apparatus. The smart card apparatus includes a processor, and a status register coupled to the processor to store status information indicative of a status associated with the processor. Control logic is coupled to the processor and to the status register to check the status information stored therein to determine the status of the processor. If the control logic determines that the status information indicates a non-responsive state associated with the processor, the control logic can initiate a reset signal to the processor to remove the processor from the non-responsive state.

BRIEF DESCRIPTION OF THE SEVERAL VIEWS OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments for autoreset of smart card devices, such as a Universal Serial Bus (USB) smart card, in a mute mode (or other similar mode) are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention provides a technique to automatically get a SC out of a mode where the SC is no longer accepting or processing commands. More particularly in one embodiment, a technique is provided to autoreset a USB SC from a mute mode.

An embodiment is provided where autoreset may be performed without having to create or define a specific USB vendor specific request (VSR) that generates a "warm reset" (i.e., a software reset command from the USB host). VSR is a functionality provided by the USB specification that allows the user to define application functions in the control transfer mode that are not included in the USB specification. With a specifically defined VSR (called hereinafter "DoReset"), the VSR is decoded by the hardware of the SC in the USB device controller and generates a hardware "warm reset" within the SC. A "warm reset" is different from a "cold reset," which is the hardware reset of a device. Usually a "warm reset" is generated by software. A particularity of this "warm reset" in this embodiment is to reset only the processor and not the USB device controller. A VSR implementation is typically more inflexible and complex, since it often needs a specific PC driver to be loaded onto the PC host and/or SC. Moreover, such specific VSRs would require hardware modification of a SC, with the VSR having to be decoded by the hardware and the control logic has to manage its action, which may undesirably take a SC out of a standard device class. In contrast, an embodiment of the invention provides a USB device controller (on the SC) that detects the state of the SC's CPU by polling a status register, and in the event of a mute mode, the USB device controller automatically generates a reset of the SC's CPU, thereby preserving the USB device controller configuration and setting and thus maintaining the communication with the USB host.

By way of discussion, a USB smart card comprises a microcontroller (such as a CPU or other processor) and a USB peripheral block on the same chip. The USB peripheral block is a slave to an external USB host, and is designed to respond to all standard USB or VSR requests from the USB host. The USB host uses a command (such as Control Mode Transfer) to control or send specific commands to a USB SC. In addition to these commands, the USB specification has some features to ensure that the USB bus is always ready, such as Bus Reset, Single-Ended Zero (SE0), Suspend and Resume, Keep Alive, Preamble, etc.

The role of the USB peripheral block is to then transfer data received from the USB host to the SC's CPU and memories, and vice-versa. The SC's CPU decodes the data, which can be a higher-level instruction or request from the host PC, or simply reads such data so that it can be used by some embedded application(s). The interaction between the microcontroller and the USB peripheral block requires that they always be in operation. In the event of an abnormal condition (such as a change in the SC's embedded code, a hacker attack, receipt of an unauthorized command, entry into an infinite software loop, and the like), the SC's CPU stops responding to requests from the USB peripheral block, which causes the USB peripheral block to stall or otherwise not respond to the USB host's requests.

The SC has thus entered a mute mode, where as described above, a hard reset may be performed to remove the SC from the mute mode. Also as described above, another technique is to use a VSR, if one has been defined, to perform a warm reset. In accordance with embodiments of the invention that will be described next, alternative or additional techniques are provided to automatically perform the reset.

One embodiment of the invention provides a USB smart card apparatus. The USB smart card apparatus includes a processor and a USB device controller. The communication between these two entities is register-based coupled with an interrupt-based mechanism in an embodiment. This register interface includes a status register coupled to the processor to store status information indicative of a status associated with the processor. Control logic, which is part of the USB device controller, is coupled to the processor and to the status register to check the status information stored therein to determine the status of the processor. If the control logic determines that the status information indicates a non-responsive state associated with the processor, the control logic can initiate an interrupt-based reset signal to the processor to remove the processor from the non-responsive state. This reset is done keeping current the configuration and state of the USB device controller.

Figure 1:
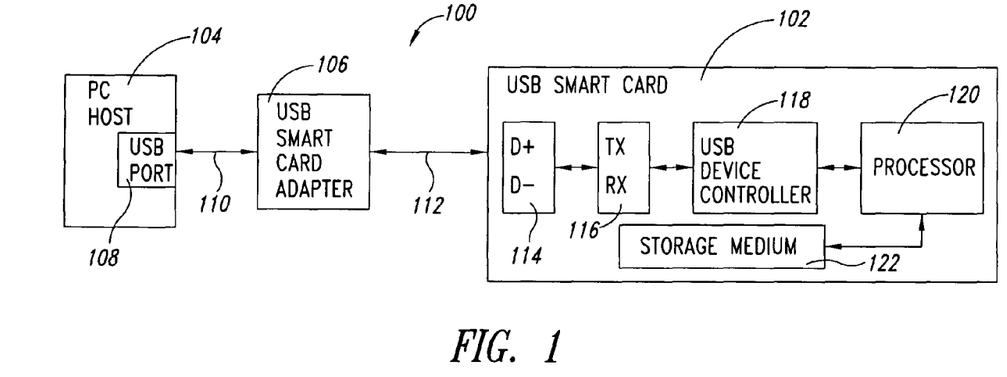
FIG. 1 is a block diagram illustrating a system in which one embodiment of the invention may be implemented.

FIG. 1 is a block diagram illustrating a system 100 in which one embodiment of the invention may be implemented. A USB smart card 102 is communicatively coupled to a PC host 104 by way of a USB smart card adapter 106. The PC host 104 includes a USB port 108, which is used to communicatively couple the PC host 104 to the USB smart card adapter 106 via a connection 110 (such as a USB serial cable). A connection 112 completes the serial connection between the USB SC 102 and the PC host 104. Suitable USB smart card adapters are available in Schlumberger's line of E-gate smart card products, for example.

An embodiment of the SC 102 includes D+ and D− pads 114 for communication in accordance with the USB specification, a transceiver 116 to transmit and receive information between the PC host 104 and the SC 102, a USB device controller 118, a processor 120 (such as a microcontroller, CPU, or other type of processor), and a storage medium 122 with which either one or both the processor 120 or the USB device controller 118 can communicate. For purposes of brevity, not all of the possible components that may be present on the SC 102 are shown or described herein—only the components that are necessary for understanding operation of an embodiment of the invention are shown and described. A smart card having the autoreset features described herein may be also implemented in multi-mode smart cards, such as the USB-ISO dual-mode smart card disclosed in U.S. Pat. No. 6,439,464, which is incorporated herein by reference.

As will be described later below with reference to FIGS. 3–5, one embodiment of the USB device controller 118 is coupled to determine the state of the processor 120 (e.g., whether the processor 120 has entered a mute mode), such as by checking one or more status registers that is written to by the processor 120 before going to mute mode, and then takes the appropriate action to automatically reset the processor 120 from the mute mode. In an embodiment, the status register(s) may comprise part of the USB device controller 118 or part of the storage medium 122. The storage medium 122 can itself comprise one or more machine-readable storage locations to store this status information, embedded software or code, data exchanged or to be exchanged between the SC 102 and the host PC 104, or other machine-readable instruction, data, or code. The storage medium 122 can be embodied as a cache, buffer, read only memory (ROM), random access memory, data register, or other suitable data repository.

Figure 2:
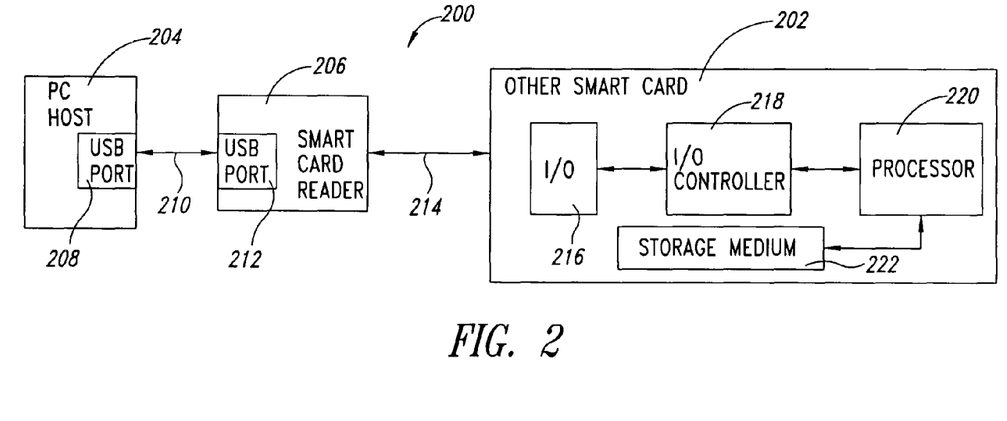
FIG. 2 is a block diagram illustrating another system in which one embodiment of the invention may be implemented.

FIG. 2 is a block diagram illustrating another system 200 for comparison with the system 100 of FIG. 1. More specifically, some other type (e.g., such as an ISO 7816 smart card) smart card 202 is provided. The SC 202 communicates with a PC host 204 by way of a smart card reader 206. In one embodiment, the PC host 204 may be a USB host that communicates with the smart card reader 206 by way of a connection 210 (such as a USB serial cable) between their USB ports 209 and 212. If the SC 202 comprises an SC that is compliant with the ISO 7816 standard, then a connection 214 can comprise an ISO 7816 contact interface.

The SC 202 includes an input/output (I/O) controller 218, a processor 220, and a storage medium 222. The I/O controller 218 is compliant with the ISO 7816-3 protocol, for instance. The SC 202 includes an I/O block 216, such as those used in an ISO 7816-compliant smart card.

For the remainder of this detailed description, embodiments of the invention will be described in the context of the SC 102 of FIG. 1. A person skilled in the art having the benefit of this disclosure would be familiar with the modifications to make, in order to implement principles of the invention in SCs that have arrangements that may be different than what is specifically shown or described here in detail.

Figure 3:
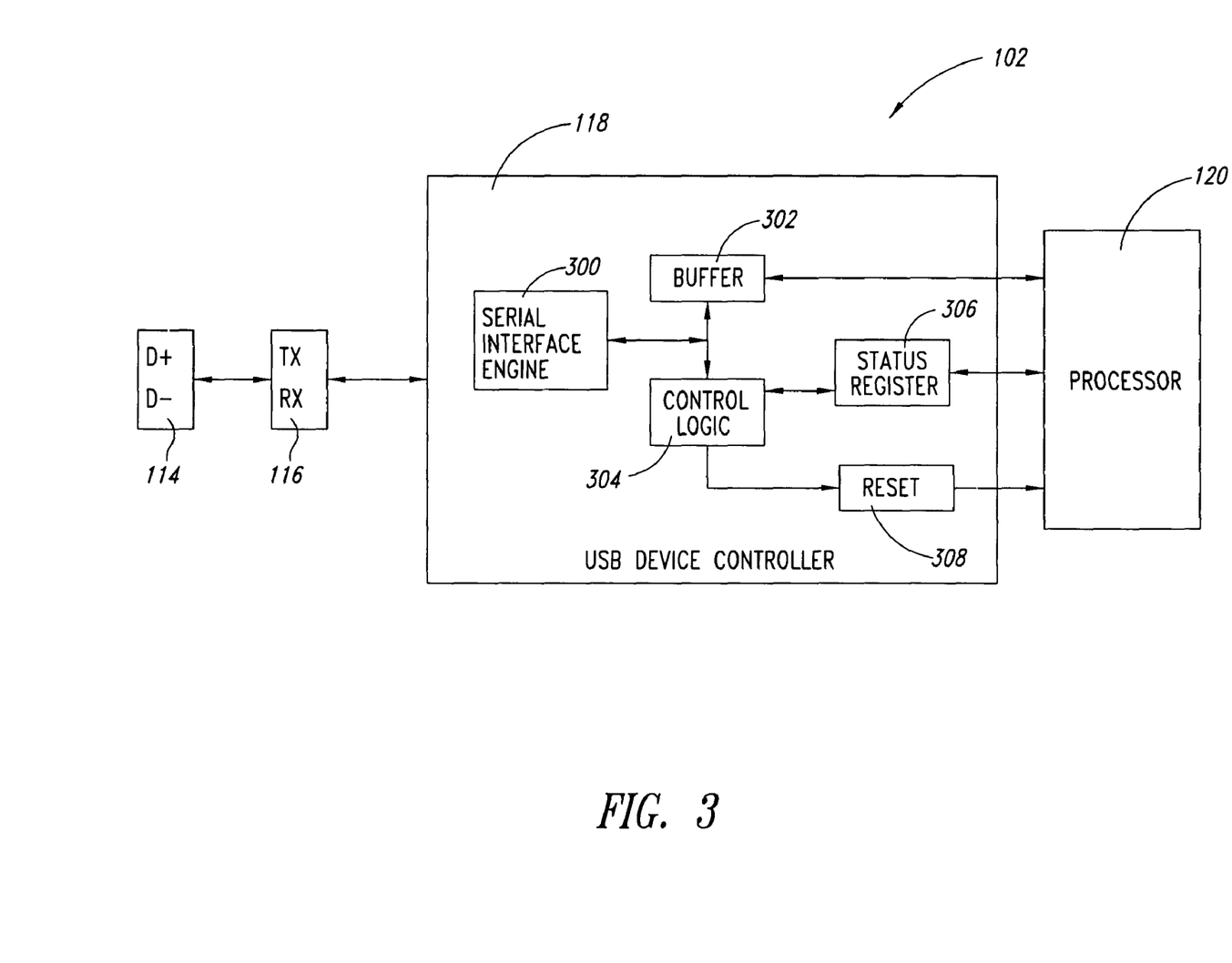
FIG. 3 is a block diagram illustrating components of a SC in accordance with an embodiment of the invention.

FIG. 3 is a block diagram illustrating components of a SC in accordance with an embodiment of the invention. More specifically, FIG. 3 shows components of the USB device controller 118 of the SC 102 in more detail. The USB device controller 118 includes a serial interface engine 300 through which is routed information to be sent to the PC host 104 or received from the PC host 104. For example, the serial interface engine 300 receives serial data from the transceiver 116 and parallelizes the data. A buffer 302 is coupled between the serial interface engine 300 and the processor 302 to store this and other information, if necessary, as the information is transferred between the processor 120 and the PC host 104.

Control logic 304 is coupled to the buffer 302 and to the serial interface engine 300 to manage and control the flow of information between the buffer 302 and the processor 120, and to also receive (or send) data (such as the parallelized data) from the serial interface engine 302 as appropriate, so that the control logic 304 can decode this data or perform other operations related to the data. The communication between the USB device controller 118 and the processor 120 can be interrupt-based in an embodiment.

Also according to an embodiment of the invention, the control logic 304 is coupled to determine the state or mode of the processor 120 and to reset it if necessary. In one such embodiment, the processor 120 repeatedly writes its status information into a status register 306. The control logic 304 polls this status register 306, and if it detects a mute mode (such as if a bit or flag is set to binary 1), the control logic 304 initiates a reset command to the processor 120 via a reset block 308.

In the illustrated embodiment, the buffer 302 and the status register 306 have been indicated as comprising part of the USB device controller 118. Again, it is appreciated that such components may be separately located elsewhere on the SC 102, such as in the storage medium 122, in other embodiments.

Figure 4:
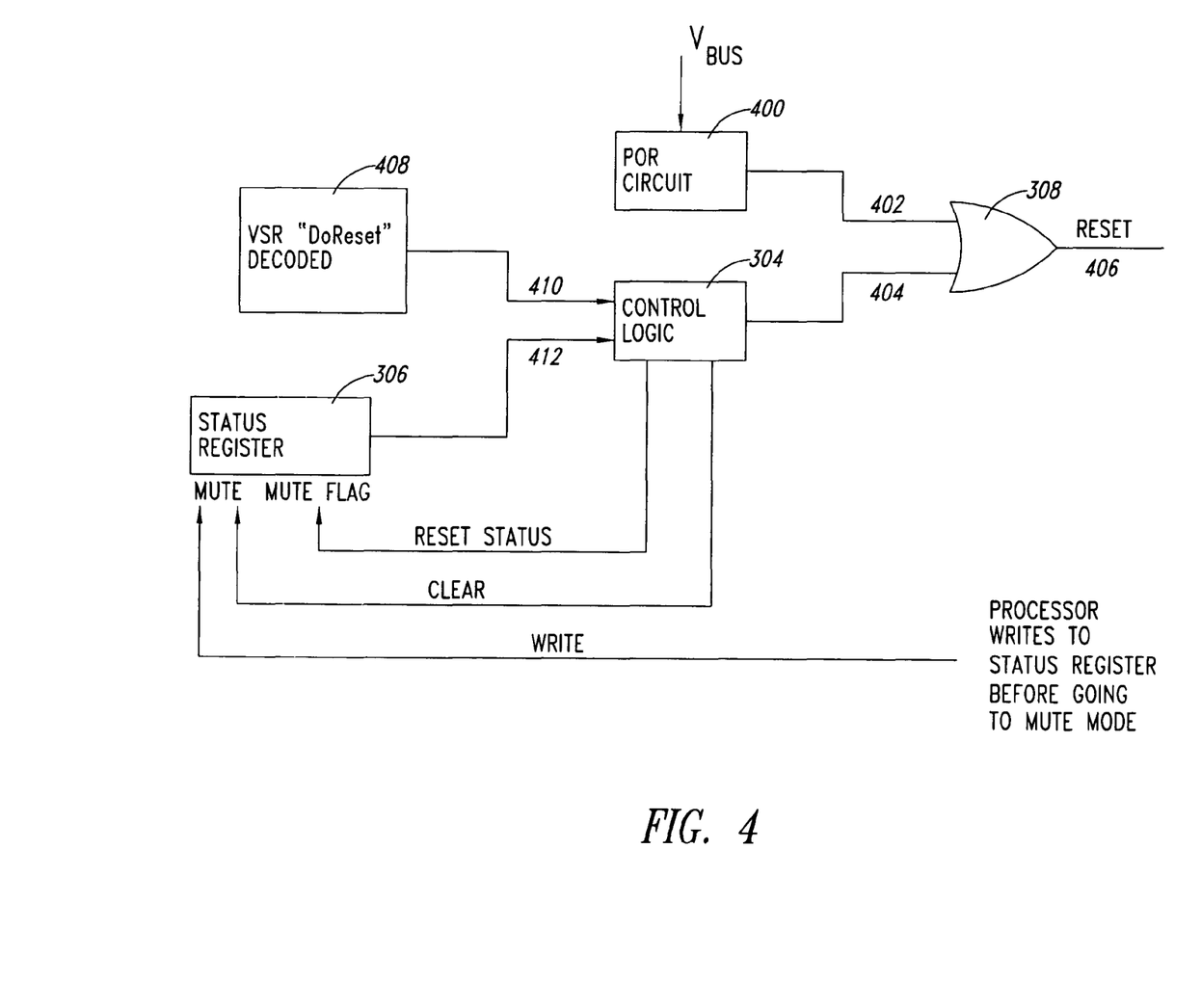
FIG. 4 is a block diagram illustrating operation of the components of FIG. 3 in more detail in accordance with an embodiment of the invention.

FIG. 4 is a block diagram illustrating operation of the components of FIG. 3 in more detail in accordance with an embodiment of the invention. More particularly, FIG. 4 illustrates the relative interaction and connection of some of the USB device controller 118 components in more detail, and the manner in which the processor 120 may be reset. FIG. 4 depicts at least three possible types of actions that may be used to reset the processor 120: a hard reset, a warm reset via use of a VSR, and an autoreset in accordance with an embodiment of the invention. The autoreset action may be used alone or in combination with either one or both the warm reset of the VSR and the hard reset.

If the processor 120 is to be reset via a hard reset (e.g., turning the power to the USB SC bus off or on, such as when initially powering up the SC 102 or when "rebooting" it), then such an operation may be performed through a Power On Reset (POR) circuit 400. The POR circuit 400 supplies $V_{BUS}$ (which may be between 4 volts and 5.5 volts supplied via the USB bus, for example) to the processor 120 to power the processor 120. $V_{BUS}$ is cut off from the processor 120 by the POR circuit 400 during the hard reset, and then subsequently re-supplied to the processor 120. In one embodiment, the reset block 308 comprises an OR gate as depicted in FIG. 4, having a first input terminal 402 coupled to an output terminal of the POR circuit 400. During a hard reset, the POR circuit 400 provides a binary 1 (or other suitable input signal) on the first input terminal 402 of the OR gate, for instance. The OR gate has an output terminal 406 coupled to the processor 120 to provide a RESET signal thereto.

A second input terminal 404 of the OR gate is coupled to an output terminal of the control logic 304. The control logic 304 provides a binary 1, for example, on the second input terminal 404 of the OR gate if either one or both the warm reset of the VSR and the autoreset of an embodiment requires a reset of the processor 120.

With regards to a warm reset using a reset VSR, a VSR block 408 is provided to receive the reset VSR (such as a DoReset command) from the D+ and D− pads 114 by way of the transceiver 116, if such a VSR has been defined and has been communicated by the PC host 104 to the SC 102. The VSR block 408 is a circuit that decodes this VSR (as well as other VSRs that may be received), and to generate an output therefrom that instructs the control logic 304 to reset the processor 120. Alternatively or in addition, the control logic 304 can do at least some of the decoding. This output from the VSR block 408 (a binary 1, for example) is provided from an output terminal of the VSR block 408 to a first input terminal 410 of the control logic 304. Upon receipt of this output from the VSR block 410, the control logic 304 provides a binary 1, for example, to the second input terminal 404 of the OR gate, which in response provides the RESET signal on its output terminal 406 to reset the processor 120.

For an autoreset implementation that is independent of a VSR, an embodiment of the invention provides use of the status register 306. This technique allows a reset to be automatically performed within the SC 102 itself, without needing the PC host 104 to generate a specific VSR command. Thus, when a mute mode is entered where the SC 102 stops responding to commands from the PC host 104, the communication link between the PC host 104 need not be broken—the SC 102 can internally initiate a reset of the processor 120 and thereby resume communication with the PC host after reset.

The processor 120 writes its status to the status register 306 via a WRITE line. For example, the processor 120 may regularly write to a bit of the status register 306 to indicate that it is ready, busy, mute, or other status information that indicates the status of the communication link between the processor 120 and the USB device controller 118. This writing to indicate transition to a mute mode may be performed in a number of possible ways.

For example, just before entering a mute mode, the processor 120 may write (via the WRITE line) to a mute bit in the status register 306 to set that bit high to a binary 1. Alternatively or in addition, the WRITE line may comprise an enable line to enable a corresponding mute bit or other element in the status register 306 that indicates the mute mode of the processor 120. It is appreciated that instead of setting the bit high to a binary 1 or using an enable line, a mute mode may be indicated by setting a bit low to a binary 0 or by using a disable line.

The control logic 304 polls the status register 306 to determine the status of the processor 120 and to receive the status information at its second input terminal 412. In an embodiment, this polling may be performed at suitable time intervals that are sufficiently spaced in time to be able to detect a change from one state to another, while in another embodiment and instead of polling, the status register 306 may provide updated status information to input terminal 412 of the control logic 304 only when there is a status change, for example.

If the status information received by the control logic 304 at its second input terminal 412 indicates a mute mode, then the control logic 304 generates a binary 1 output, for example, for the second input terminal 404 of the OR gate, which then generates the RESET signal at its output terminal 406 to reset the processor 120. The control logic 304 then provides a signal on a RESET STATUS line that writes to the status register 306, to indicate the new status of the processor 120 (e.g., ready, busy, or other status to indicate that the processor 120 has been taken off the mute mode).

In an embodiment, the status register 306 has two bits: mute bit and mute flag bit. The mute bit is written to by the processor 120 on the WRITE line to indicate its status, and is cleared by the control logic 304 via a CLEAR line (such as after the processor 120 has been reset from the mute mode). The mute flag bit is a history bit indicating that the processor 120 was in mute mode and is reset by the control logic 304. The mute flag bit serves as a history bit that keeps track of the previous mute state—this information can be used by the processor 120 to count the number of times that the processor 120 went through a mute mode, and thus help the processor decide to not reset after a certain number of times, three times for example.

Figure 5:
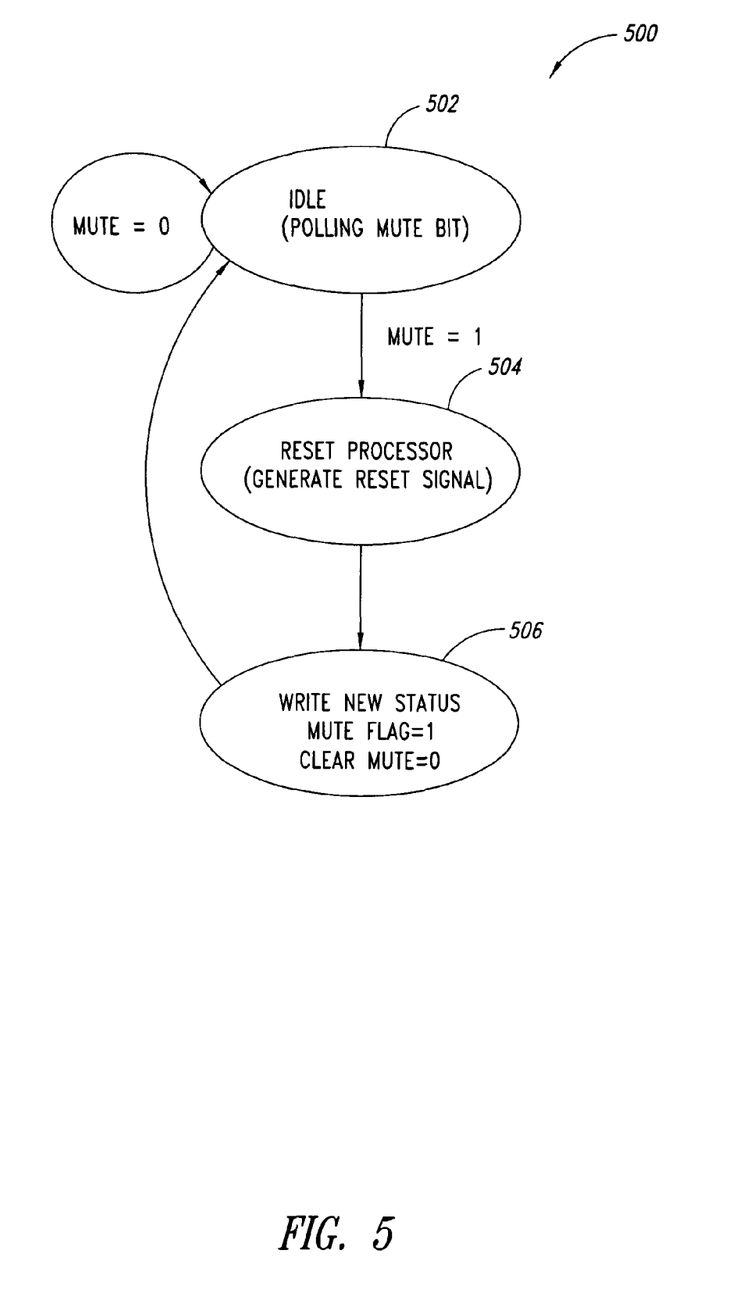
FIG. 5 is a state diagram of control logic that can be implemented by the component(s) of FIGS. 3–4 in accordance with an embodiment of the invention.

FIG. 5 is a state diagram 500 of the control logic 304 that can be implemented by the component(s) shown in FIGS. 3–4 in accordance with an embodiment of the invention. A person skilled in the art having the benefit of this disclosure can design the suitable hardware logic that will operate in accordance with the state diagram 500. In another embodiment and alternatively or in addition to hardware, the operations depicted in the state diagram 500 and described with respect to the other figures can be implemented in software or other machine-readable instruction stored on the machine-readable storage medium 122.

At a state 502, the control logic 304 (as a state machine in one embodiment) repeatedly polls the mute bit (or flag) in the status register 306. If the processor 120 has not entered into the mute mode, then the mute bit has a value of binary 0, for example. If the processor 120 is about to enter the mute mode, then the processor 120 writes to the status register 306 to set the mute bit to a value of binary 1, for example.

The mute bit at binary 1 causes the control logic 504 to transition to a state 504, where it initiates a reset of the processor 120. As depicted by way of example in FIG. 4, the control logic 504 initiates this reset by providing a signal to the OR gate, which then generates the RESET signal at its output terminal 406 and provides the RESET signal to the processor 120.

After the processor 120 has been reset, the control logic 304 transitions to a state 506. In the state 506, the control logic 304 writes the new status of the processor 120 in the status register 306. Specifically in state 506, the mute flag bit is set to binary 1 to keep the track of the previous mute state. The mute bit is cleared (to binary 0, for instance, or other reset status) to be able to catch the next mute state of the processor 120. Then, the state of the control logic 304 returns to the state 502, where the mute bit is again repeatedly polled for processor status information.

Therefore, according to the preceding description, an embodiment of the invention allows a USB SC or other type of SC to be taken out of a mute or other similar mode without necessarily having to define and use a VSR. This feature allows such SCs to be used for USB devices classes that allow "plug 'n play" and that are directly recognized by standard operating systems, without having to load a specific driver. One of many examples of such a USB class is the Chip Card Interface Device (CCID) class. Convenient plug 'n play capability with standard operating systems provides a better marketplace acceptance and improves time to market.

One advantage of this solution compared to previous systems based on an ISO smart card is the intelligence in the USB device controller 118. Contrary to an ISO smart card's I/O controller 218 that basically sets the direction and the interrupt of the I/O block 216, the USB device controller 118 has its own logic state machine dedicated to the USB protocol and the communication with the CPU. Because of this intelligence, there are other choices to get a CPU of a USB smart card out of the Mute mode, than having the host PC 104 or the reader software execute a special command.

As depicted in one embodiment, a USB smart card comprises not a single controller but two controllers on the same chip: the processor 120 (e.g., a CPU) and the USB device controller 118. This is different than an ISO 7816-3 smart card that has only one controller: the CPU. Therefore, one embodiment of the solution to reset a USB smart card in mute mode can be done by the USB host firmware in a similar manner as the firmware of a ISO 7816-3 smart card reader for a ISO smart card, or directly by the USB device controller 118, which is sufficiently intelligent to perform the reset upon the detection of a mute condition.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

For example, while some embodiments have been described in the context of a USB implementation, it is appreciated that the invention is not necessarily limited to this. Other embodiments of the invention can have implementations based on other standards, protocols, or configurations that operate in a manner similar to USB.

Moreover, embodiments have been described as involving use of binary logic 0 or 1. It is appreciated that these values are merely illustrative in the specifically described implementations, and were provided and intended to depict changes from one state to another, rather than limiting the invention to the specific binary values indicated.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A smart card apparatus, comprising:
   a processor;
   a status register coupled to the processor to store status information that is provided by the processor to the status register and that is indicative of a status associated with the processor; and
   control logic coupled to the processor and to the status register to check the status information stored therein to determine the status of the processor, wherein if the control logic determines that the status information indicates a non-responsive state associated with the processor, the control logic can initiate a reset signal to the processor to remove the processor from the non-responsive state.

2. The apparatus of claim 1 wherein the non-responsive state comprises a mute mode.

3. The apparatus of claim 1 wherein the processor, status register, and control logic comprise part of a universal serial bus (USB)-compliant smart card.

4. The apparatus of claim 1, further comprising reset logic coupled between the control logic and the processor to provide the reset signal to the processor.

5. The apparatus of claim 4, further comprising:
   a power on reset circuit, having an output terminal coupled to a first input terminal of the reset logic, to provide a first input signal to the reset logic to allow the reset logic to generate the reset signal in response thereto;
   a second input terminal of the reset logic coupled to an output terminal of the control logic to receive a second input signal from the control logic;
   a vendor specific request (VSR) block, having an output terminal coupled to a first input terminal of the control logic, to decode a received VSR and to provide a corresponding VSR signal to the control logic to allow the control logic to generate the second input signal in response thereto; and
   a second input terminal of the control logic coupled to the status register to receive the status information stored therein, wherein the control logic can generate the second input signal to the reset logic if the status information is indicative of the non-responsive state.

6. The apparatus of claim 5 wherein the reset logic comprises an OR gate.

7. The apparatus of claim 1, further comprising:
   a first line coupled between the processor and the status register to allow the processor to provide the status information to an element of the status register in a manner that the element is indicative of the non-responsive status;
   a second line coupled between the control logic and the status register to allow the control logic to provide status information associated with the processor to the status register, after the processor has been removed from the non-responsive state; and
   a third line coupled between the control logic and the status register to clear the element in the status register indicative of the non-responsive state.

8. The apparatus of claim 7 wherein the element of the status register comprises a bit that can be set.

9. A smart card system, comprising:
   a means for storing processor status information provided by a processor;
   a means for checking the stored processor status information to determine if the processor has entered a non-responsive mode; and
   a means for automatically resetting the processor from the non-responsive mode, if the stored processor status information indicates that the processor has entered the non-responsive mode.

10. The system of claim 9, further comprising:
    a means for providing external information to the processor and for receiving information from the processor;
    a means for communicating between the means for providing external information and the processor;
    a means for receiving the external information from the means for communicating; and
    a means for routing and for buffering the received external information.

11. The system of claim 9, further comprising a means for updating the processor status information before the processor has entered the non-responsive mode and after the processor has been reset from the non-responsive mode.

12. The system of claim 9, further comprising either one or both:
    a means for resetting the processor based on supplied power; and
    a means for resetting the processor based on a request.

13. A method usable for a smart card, the method comprising:
    receiving from a processor and storing status information associated with a state of the processor;
    checking the stored status information to determine if the status information indicates that the processor has entered a non-responsive state; and
    if the status information indicates that the processor has entered the non-responsive state, automatically resetting the processor to remove it from the non-responsive state.

14. The method of claim 13 wherein checking the stored status information to determine if the status information indicates that the processor has entered the non-responsive state comprises checking the stored status information to determine if the processor has entered a mute mode.

15. The method of claim 13 wherein storing status information associated with the state of a processor comprises setting a bit prior to the processor's entry into the non-responsive state.

16. The method of claim 13, further comprising:
    updating the status information to indicate that the processor is reset from the non-responsive state; and
    clearing any of the status information that is indicative of the non-responsive state.

17. The method of claim 13, further comprising at least one of the following:
    resetting the processor in response to a first signal associated with power supplied to the processor; and
    resetting the processor in response to a specific request received from a host device to reset the processor.

18. An article of manufacture, comprising:
    a machine-readable medium having instructions stored thereon to:
    store status information received from a processor and associated with a state of the processor;
    check the stored status information to determine if the status information indicates that the processor has entered a non-responsive state; and
    automatically reset the processor to remove it from the non-responsive state, if the status information indicates that the processor has entered the non-responsive state.

19. The article of manufacture of claim 18 wherein the machine-readable medium further includes instructions stored thereon to:
    update the status information to indicate that the processor is reset from the non-responsive state; and
    clear any of the status information that is indicative of the non-responsive state.

20. The article of manufacture of claim 18 wherein the machine-readable medium further includes instructions stored thereon to:
    reset the processor in response to a first signal associated with power supplied to the processor; and reset the processor in response to a specific request received from a host device to reset the processor.

21. The article of manufacture of claim 18 wherein the instructions to check the stored status information include instructions to regularly poll a data repository to obtain the status information.

22. The article of manufacture of claim 18 wherein the instructions to check the stored status information include instructions to review the status information after it has been updated in response to a change in status.

23. A smart card apparatus, comprising:
a processor; and
a device controller that can perform register-based and interrupt-based communication with the processor, the device controller including:
a status register coupled to the processor to store status information that is provided by the processor to the status register and that is indicative of a status associated with the processor; and
control logic coupled to the processor and to the status register to check the status information stored therein to determine the status of the processor, wherein if the control logic determines that the status information indicates a non-responsive state associated with the processor, the control logic can initiate a reset signal to the processor to remove the processor from the non-responsive state.

24. The apparatus of claim 23 wherein the control logic can initiate the reset signal and a current configuration and state of the device controller is maintained.

25. The apparatus of claim 23 wherein the status register includes:
a first bit that can be set to indicate that the processor is to enter the non-responsive state and can be cleared if the processor has been removed from the non-responsive state; and
a second bit that can be used to track a history of non-responsive states of the processor.

26. The apparatus of claim 25, further comprising:
a first line coupled between the processor and the status register to allow the processor to set the first bit of the status register;
a second line coupled between the control logic and the status register to allow the control logic to set the second bit each time the processor is removed from non-responsive states; and
a third line coupled between the control logic and the status register to allow the control logic to clear the first bit after the processor has been removed from the non-responsive state.

27. The apparatus of claim 23 wherein the device controller comprises part of a USB-compliant smart card, and wherein the non-responsive state comprises a mute mode.

28. A smart card apparatus, comprising:
a processor;
a storage device coupled to the processor to store status information indicative of a status associated with the processor;
control logic coupled to the processor and to the storage device to check the status information stored therein to determine the status of the processor, wherein if the control logic determines that the status information indicates a non-responsive state associated with the processor, the control logic can initiate a reset signal to the processor to remove the processor from the non-responsive state; and a first line coupled between the processor and the storage device to allow the processor to provide the status information to an element of the storage device in a manner that the element is indicative of the non-responsive status;
a second line coupled between the control logic and the storage device to allow the control logic to provide status information associated with the processor to the storage device, after the processor has been removed from the non-responsive state; and
a third line coupled between the control logic and the storage device to clear the element in the storage device indicative of the non-responsive state.

29. The apparatus of claim 28 wherein the element of the storage device comprises a bit that can be set.

30. The apparatus of claim 28, further comprising:
reset logic coupled between the control logic and the processor to provide the reset signal to the processor;
a power on reset circuit, having an output terminal coupled to a first input terminal of the reset logic, to provide a first input signal to the reset logic to allow the reset logic to generate the reset signal in response thereto;
a second input terminal of the reset logic coupled to an output terminal of the control logic to receive a second input signal from the control logic;
a vendor specific request (VSR) block, having an output terminal coupled to a first input terminal of the control logic, to decode a received VSR and to provide a corresponding VSR signal to the control logic to allow the control logic to generate the second input signal in response thereto; and
a second input terminal of the control logic coupled to the storage device to receive the status information stored therein, wherein the control logic can generate the second input signal to the reset logic if the status information is indicative of the non-responsive state.

31. A smart card system, comprising:
means for storing processor status information;
means for checking the stored processor status information to determine if a processor has entered a non-responsive mode;
means for automatically resetting the processor from the non-responsive mode, if the stored processor status information indicates that the processor has entered the non-responsive mode;
means for providing external information to the processor and for receiving information from the processor;
means for communicating between the means for providing external information and the processor;
means for receiving the external information from the means for communicating; and
means for routing and for buffering the received external information.

32. The smart card system of claim 31 wherein the processor writes at least some of the processor status information into the means for storing.

33. A smart card system, comprising:
means for storing processor status information;
means for checking the stored processor status information to determine if a processor has entered a non-responsive mode;
means for automatically resetting the processor from the non-responsive mode, if the stored processor status information indicates that the processor has entered the non-responsive mode; and means for updating the processor status information before the processor has entered the non-responsive mode and after the processor has been reset from the non-responsive mode.

34. The smart card system of claim 33 wherein the processor writes at least some of the processor status information into the means for storing.

35. A method usable for a smart card, the method comprising:
   storing status information associated with a state of a processor, including setting a bit prior to the processor's entry into a non-responsive state;
   checking the stored status information to determine if the status information indicates that the processor has entered the non-responsive state; and
   if the status information indicates that the processor has entered the non-responsive state, automatically resetting the processor to remove it from the non-responsive state.

36. The method of claim 35 wherein storing status information associated with the state of the processor includes storing at least some of status information provided by the processor.

37. A method usable for a smart card, the method comprising:
   storing status information associated with a state of a processor;
   checking the stored status information to determine if the status information indicates that the processor has entered a non-responsive state; and
   if the status information indicates that the processor has entered the non-responsive state, automatically resetting the processor to remove the processor from the non-responsive state;
   updating the status information to indicate that the processor is reset from the non-responsive state; and
   clearing any of the status information that is indicative of the non-responsive state.

38. The method of claim 37 wherein storing status information associated with the state of the processor includes storing at least some of status information provided by the processor.

39. An article of manufacture, comprising:
   a machine-readable medium having instructions stored thereon to:
   store status information associated with a state of a processor;
   check the stored status information to determine if the status information indicates that the processor has entered a non-responsive state;
   automatically reset the processor to remove the processor from the non-responsive state, if the status information indicates that the processor has entered the non-responsive state;
   update the status information to indicate that the processor is reset from the non-responsive state; and
   clear any of the status information that is indicative of the non-responsive state.

40. The article of manufacture of claim 39 wherein the instructions to check the stored status information include instructions to regularly poll a data repository to obtain the status information.

41. The article of manufacture of claim 39 wherein the instructions to check the stored status information include instructions to review the status information after it has been updated in response to a change in status.

42. A smart card apparatus, comprising:
   a processor; and
   a device controller that can perform register-based and interrupt-based communication with the processor, the device controller including:
   a storage device coupled to the processor to store status information indicative of a status associated with the processor;
   control logic coupled to the processor and to the storage device to check the status information stored therein to determine the status of the processor, wherein if the control logic determines that the status information indicates a non-responsive state associated with the processor, the control logic can initiate a reset signal to the processor to remove the processor from the non-responsive state;
   a first bit that can be set to indicate that the processor is to enter the non-responsive state and can be cleared if the processor has been removed from the non-responsive state; and
   a second bit that can be used to track a history of non-responsive states of the processor.

43. The apparatus of claim 42, further comprising:
   a first line coupled between the processor and the storage device to allow the processor to set the first bit of the storage device;
   a second line coupled between the control logic and the storage device to allow the control logic to set the second bit each time the processor is removed from non-responsive states; and
   a third line coupled between the control logic and the storage device to allow the control logic to clear the first bit after the processor has been removed from the non-responsive state.

* * * * *